US011632311B2

(12) United States Patent
Miller et al.

(10) Patent No.: US 11,632,311 B2
(45) Date of Patent: *Apr. 18, 2023

(54) PROVISIONING SERVER FOR AUTOMATED DATA PROVIDER PROVISIONING AND ASSOCIATED METHODS

(71) Applicant: The Toronto-Dominion Bank, Toronto (CA)

(72) Inventors: Robert Kyle Miller, Mississauga (CA); Sonja Torbica, Toronto (CA); Helene Nicole Esposito, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 60 days.

This patent is subject to a terminal disclaimer.

(21) Appl. No.: 17/351,858

(22) Filed: Jun. 18, 2021

(65) Prior Publication Data

US 2021/0314241 A1 Oct. 7, 2021

Related U.S. Application Data

(63) Continuation of application No. 15/998,416, filed on Aug. 15, 2018, now Pat. No. 11,070,448.

(51) Int. Cl.
*G06Q 30/04* (2012.01)
*H04L 41/5054* (2022.01)
(Continued)

(52) U.S. Cl.
CPC ........ *H04L 41/5054* (2013.01); *G06F 40/205* (2020.01); *G06Q 30/04* (2013.01);
(Continued)

(58) Field of Classification Search
CPC . H04L 41/5054; H04L 41/5096; H04L 51/08; H04L 67/10; G06F 40/205; G06Q 30/04
See application file for complete search history.

(56) References Cited

U.S. PATENT DOCUMENTS 6,609,200 B2 8/2003 Anderson
7,051,001 B1 * 5/2006 Slater ..................... G06Q 20/18
705/26.1

(Continued)

OTHER PUBLICATIONS

Office Action; U.S. Appl. No. 15/998,416 dated May 18, 2020.
(Continued)

*Primary Examiner* — Jonathan A Bui
*Assistant Examiner* — Kidest Mendaye
(74) *Attorney, Agent, or Firm* — Ridout & Maybee LLP

(57) ABSTRACT

A provisioning server for automated provisioning and associated methods are disclosed. The provisioning server extracts data from a data transfer instruction for a data provider addition based on a matching data transfer instruction template, and parses the extracted data in accordance with the matching data transfer instruction template to identify an account identifier. Data transfer information for an identified data provider and an identified account identifier from a data provider database are determined. The data provider database comprises data provider information comprising data provider names for a plurality of data providers registered with the provisioning server. A data provider record is generated and stored in a data provider list of the account in an account database. The data provider record includes the identified data provider name, identified account identifier and the data transfer information.

20 Claims, 7 Drawing Sheets

(51) Int. Cl.
*H04L 41/50* (2022.01)
*H04L 51/08* (2022.01)
*G06F 40/205* (2020.01)
*H04L 67/10* (2022.01)

(52) U.S. Cl.
CPC .......... *H04L 41/5096* (2013.01); *H04L 51/08* (2013.01); *H04L 67/10* (2013.01)

(56) References Cited

U.S. PATENT DOCUMENTS

| | | | |
|---|---|---|---|
| 8,484,104 | B1 | 7/2013 | Hurlbutt |
| 8,630,947 | B1 | 1/2014 | Freund |
| 8,660,950 | B2 * | 2/2014 | MacKouse ............ G06Q 30/04 |
| | | | 705/40 |
| 8,793,174 | B1 | 7/2014 | Wehunt |
| 9,652,753 | B2 | 5/2017 | Caldwell |
| 9,824,342 | B2 * | 11/2017 | Kelly .................... G06Q 20/14 |
| 9,940,668 | B2 | 4/2018 | Caldwell |
| 2004/0088251 | A1 | 5/2004 | Moenickheim |
| 2007/0179885 | A1 * | 8/2007 | Bird ....................... G06Q 20/10 |
| | | | 705/39 |
| 2013/0226783 | A1 * | 8/2013 | Haggerty ............... G06Q 30/02 |
| | | | 705/38 |
| 2014/0279310 | A1 * | 9/2014 | Fossella ................ G06Q 40/12 |
| | | | 705/30 |
| 2015/0012489 | A1 * | 1/2015 | Ceribelli ............... G06Q 30/04 |
| | | | 707/611 |
| 2015/0088709 | A1 * | 3/2015 | Mekala .................. G06Q 30/04 |
| | | | 705/34 |
| 2015/0339668 | A1 * | 11/2015 | Wilson .................. G06Q 20/425 |
| | | | 705/41 |
| 2016/0012465 | A1 * | 1/2016 | Sharp .................... G06Q 20/321 |
| | | | 705/14.17 |
| 2016/0125368 | A1 * | 5/2016 | Grassadonia ........ G06Q 20/305 |
| | | | 705/44 |

OTHER PUBLICATIONS

Office Action; U.S. Appl. No. 15/998,416 dated Nov. 30, 2020.
Advisory Action; U.S. Appl. No. 15/998,416 dated Feb. 17, 2021.
Notice of Allowance; U.S. Appl. No. 15/998,416 dated Mar. 23, 2021.

* cited by examiner

PROVISIONING SERVER FOR AUTOMATED DATA PROVIDER PROVISIONING AND ASSOCIATED METHODS

RELATED APPLICATION DATA

The present application is a continuation of U.S. patent application Ser. No. 15/998,416, filed Aug. 15, 2018, the content of which is incorporated herein by reference.

TECHNICAL FIELD

The present disclosure relates to data provider provisioning, and in particular, to a provisioning server for automated data provider provisioning and associated methods.

BACKGROUND

Provisioning data transfer communications is a process by which the ability to send and/or receive data transfer communications between entities, such as a sender and data provider, is established. Provisioning data transfer communications can be a challenging and error prone exercise for some users for several reasons. First, the required information for provisioning data transfer communications may not be clear and may differ between data transfer networks. In addition, where and how to collect the required information may not be clear. As a result, provisioning data transfer communications can be challenging and prone to errors for some users, particularly for seniors, users with disabilities, users with language comprehension challenges, and users who are uncomfortable with technology. Accordingly, there is a need for methods, devices and systems for automated data provider provisioning.

DESCRIPTION OF EXAMPLE EMBODIMENTS

Figure 1A:
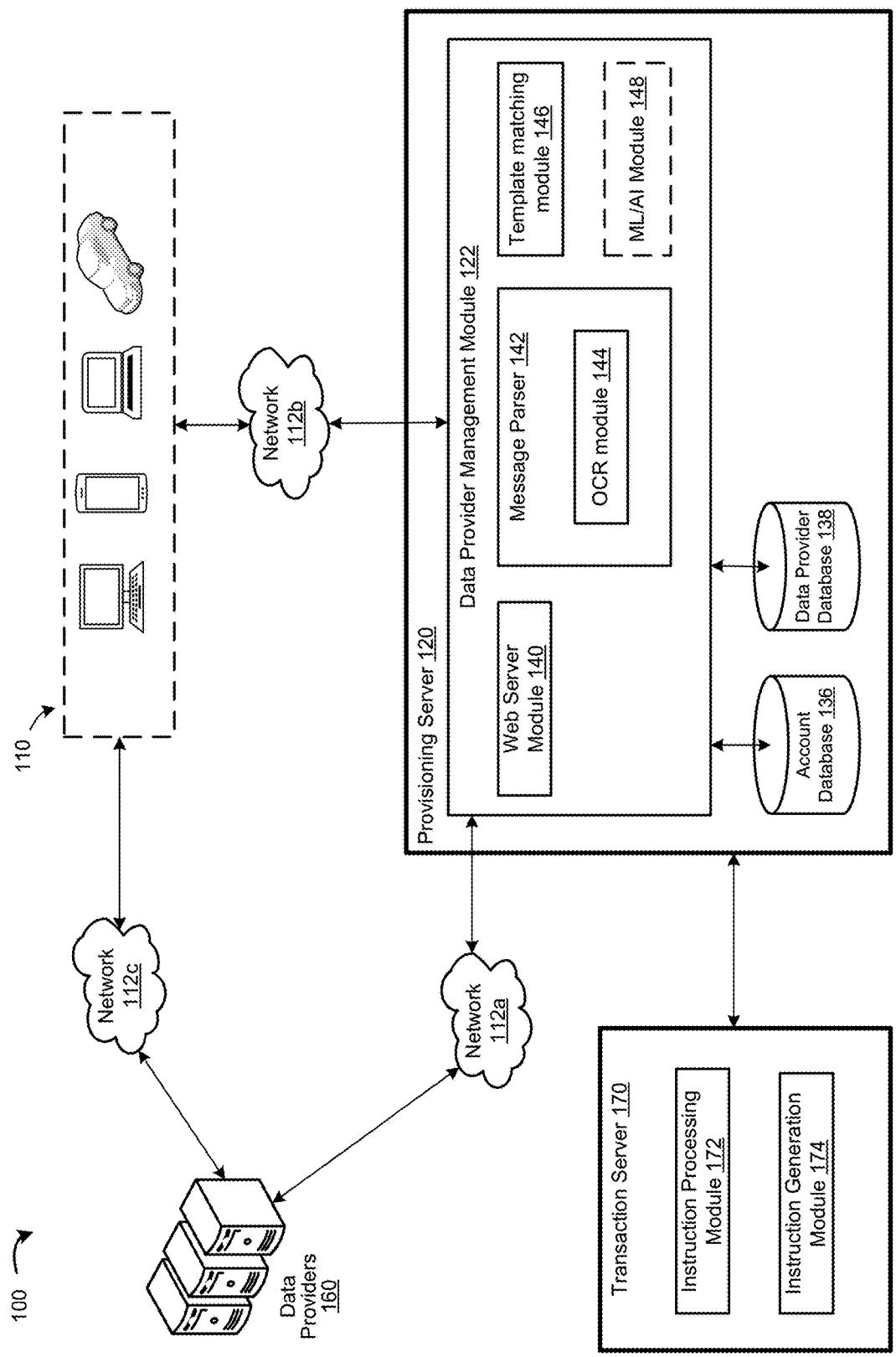
FIG. 1A is a general schematic diagram showing components of a communication system in accordance with an example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The present disclosure provides a provisioning server for automated data provider provisioning and associated methods. A user may initiate the automated provisioning without having to identify or input the required provisioning data, thereby simplifying the provisioning process for users and reducing the likelihood of errors in the provisioning process. The method may be initiated by a data transfer.

In accordance with one embodiment of the present disclosure, there is provided a provisioning server for automated data provider provisioning. The provisioning server comprises a processor, a communication subsystem coupled to the processor, and a memory coupled to the processor. A provisioning module is stored in the memory, the provisioning module comprising executable instructions that, when executed by the processor, cause the provisioning server to: receive a signal via the communications subsystem from a first data transfer network, the signal including a message containing a data transfer instruction; identify an account corresponding to a sender of the message in an account database using identifying information of a sender or recipient of the signal; automatically perform a data provider addition procedure when the message is determined to match one or more message classification rules for a data provider addition request. The data provider addition procedure comprises: comparing the data transfer instruction to a plurality of data transfer instruction templates in a data transfer instruction template database to identify any matching data transfer instruction template; and when the data transfer instruction matches a data transfer instruction template in the data transfer instruction template database: extracting data from the data transfer instruction for the data provider addition based on the matching data transfer instruction template; parsing the extracted data in accordance with the matching data transfer instruction template to identify an account identifier; determining data transfer information for a second data transfer network for the identified data provider and the identified account identifier from a data provider database, the data provider database comprising data provider information comprising data provider names for a plurality of data providers registered with the provisioning server; generating a data provider record including the identified data provider name, identified account identifier and the data transfer information; and storing the data provider record in a data provider list of the account in the account database.

In accordance with another embodiment of the present disclosure, there is provided a method for a provisioning server for automated data provider provisioning. The method comprises: receiving a signal via a communications subsystem of the provisioning server from a first data transfer network, the signal including a message containing a data transfer instruction; identifying an account corresponding to a sender of the message in an account database using identifying information of a sender or recipient of the signal automatically performing a data provider addition procedure when the message is determined to match one or more message classification rules for a data provider addition request. The data provider addition procedure comprising: comparing the data transfer instruction to a plurality of data transfer instruction templates in a data transfer instruction template database to identify any matching data transfer instruction template; and when the data transfer instruction matches a data transfer instruction template in the data transfer instruction template database: extracting data from the data transfer instruction for the data provider addition based on the matching data transfer instruction template; parsing the extracted data in accordance with the matching data transfer instruction template to identify an account identifier; determining data transfer information for a second data transfer network for the identified data provider and the identified account identifier from a data provider database, the data provider database comprising data provider information comprising data provider names for a plurality of data providers registered with the provisioning server; generating a data provider record including the identified data provider name, identified account identifier and the data transfer information; and storing the data provider record in a data provider list of the account in the account database.

In accordance with a further embodiment of the present disclosure, there is provided a provisioning server for automated data provider provisioning, comprising: a processor; a communication subsystem coupled to the processor; a memory coupled to the processor; and wherein the processor is configured to: receive a message containing a data transfer instruction, the data transfer instruction being from a first account associated with a first entity to a second account associated with a second entity; identify the first account from a user account database using a messaging address of a sender of the message, wherein the user account database comprises mappings between user account identifiers and messaging addresses and first provisioning data for provisioning data transfers with user accounts; automatically perform a data provider addition procedure in response to a determination that the message matches one or more message classification rules for a data provider addition request, the data provider addition procedure comprising: extracting data from the data transfer instruction for the data provider addition based on a matching data transfer instruction template; parsing the extracted data in accordance with the matching data transfer instruction template to identify an account identifier of the second account associated with the second entity; determining, from a data provider database distinct from the user account database, second provisioning data for provisioning data transfers to the second account associated with the second entity using the account identifier of the second account, the data provider database comprising provisioning data for provisioning data transfers with a plurality of data providers registered with the provisioning server, the data provider database comprising data provider information comprising data provider names for the plurality of data providers registered with the provisioning server; generating a data provider record including the data provider name, account identifier and the second provisioning data of the second account associated with the second entity; and storing the data provider record in a data provider list of the first account in the user account database.

In accordance with a further embodiment of the present disclosure, there is provided a method for a provisioning server for automated data provider provisioning, comprising: receiving a message containing a data transfer instruction, the data transfer instruction being from a first account associated with a first entity to a second account associated with a second entity; identifying the first account from a user account database using a messaging address of a sender of the message, wherein the user account database comprises mappings between user account identifiers and messaging addresses and first provisioning data for provisioning data transfers with user accounts; automatically performing a data provider addition procedure in response to a determination that the message matches one or more message classification rules for a data provider addition request, the data provider addition procedure comprising: extracting data from the data transfer instruction for the data provider addition based on a matching data transfer instruction template; parsing the extracted data in accordance with the matching data transfer instruction template to identify an account identifier of the second account associated with the second entity; determining, from a data provider database distinct from the user account database, second provisioning data for provisioning data transfers to the second account associated with the second entity using the account identifier of the second account, the data provider database comprising provisioning data for provisioning data transfers with a plurality of data providers registered with the provisioning server, the data provider database comprising data provider information comprising data provider names for the plurality of data providers registered with the provisioning server; generating a data provider record including the data provider name, account identifier and the second provisioning data of the second account associated with the second entity; and storing the data provider record in a data provider list of the first account in the user account database.

In accordance with a further embodiment of the present disclosure, there is provided a non-transitory machine-readable medium having tangibly stored thereon executable instructions for execution by a processor of a provisioning server. The executable instructions, when executed by the processor, cause the provisioning server to perform the methods described above and herein.

Communication System

Figure 1B:
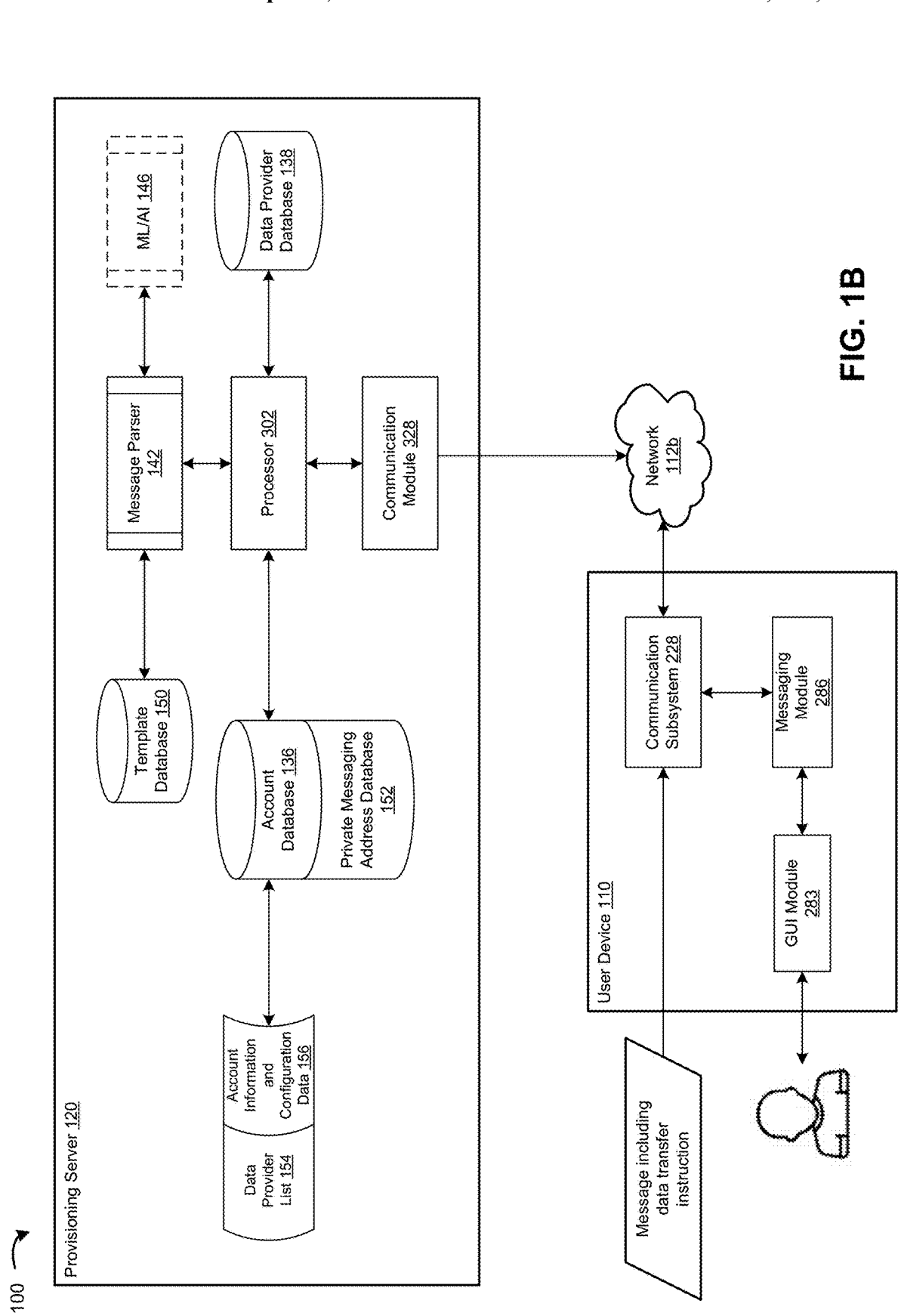
FIG. 1B is detailed schematic diagram showing components of the communication system of FIG. 1A in accordance with an example embodiment of the present disclosure.

Reference is first made to FIGS. 1A and 1B which shows in schematic block diagram form a communication system 100 in accordance with one example embodiment of the present disclosure. The communication system 100 comprises a provisioning server 120 in communication with a plurality of data providers 160 through a first communication network 112a and a plurality of user devices 110 through a second communication network 112b. The data providers 160 may be in communication with the plurality of user devices 110 through a third communication network 112c. The communication networks 112a-112c may be the same or different depending on the embodiment. The communication networks 112a-112c may be or comprise one or more network types coupled via appropriate methods known in the art, such as a proprietary network, a local area network (LAN) such as a wireless local area network (WLAN) such as Wi-Fi™, a wireless personal area network (WPAN) such as a Bluetooth™ based WPAN, a wide area network (WAN), a public-switched telephone network (PSTN), or a publicland mobile network (PLMN) also referred to as a wireless wide area network (WWAN) or a cellular network, the internet and/or other suitable communication network.

The provisioning server 120 comprises a controller comprising at least one processor 302 (such as a microprocessor) which controls the overall operation of the provisioning server 120. The processor 302 is coupled to a plurality of components via a communication bus (not shown) which provides a communication path between the components and the processor 302. The processor 302 is coupled to a communication subsystem 328 that communicates with corresponding communication subsystems of user devices 110 and data providers 160 by sending and receiving corresponding signals. The communication subsystem 328 may communicate via one or a combination of Bluetooth® or other short-range wireless communication protocol, Wi-Fi™, and a cellular, among other possibilities. The processor 302 is also coupled to an account database 136 which stores first provisioning data associated with users in an account database 136 in corresponding records and a data provider database 138 which stores second provisioning data associated with the data providers 160 in corresponding records.

Each account in the account database 136 has account information and configuration data 156, such as an account holder name, login (user) name, account holder address, etc. as well as a data provider list 154 comprising one or more data providers 160 for which data transfers are provisioned. The data provider list 154 may have multiple data provider entries, and therefore each entry in the account database 136 may be linked to multiple entries in the data provider database 138. Each entry in the data provider database 138 will also point to multiple entries in the account database 136, and therefore multiple links may exist between each entry in the account database 136 and entries in the account database 136.

The data provider database 138 comprises data provider information comprising data provider names and data transfer information for a plurality of data providers 160 registered with the provisioning server 120. The data transfer information, also known as provisioning data, specifies how to send and/or receive data transfers, including data transfer signals and other communications and any messages contained therein. The data transfers may comprise messages. The data transfers, when comprising financial transactions, may comprise remittances in which case the data transfer information may comprise remittance data for the data providers 160. The remittances may be bill payments, bill payment instructions or electronic funds transfer instructions, in which case the data transfer information may comprise biller remittance data. The remittance data may be provided by the data providers 160 or operated by an operator of the provisioning server 120 from the data providers 160. The remittances may be bill payments or bill payment instructions, in which case the data transfer information may comprise biller remittance data for the data providers 160.

The user devices 110 comprise at least a controller comprising at least one processor 202 (such as a microprocessor), coupled to a communication subsystem 228 that communicates with corresponding communication subsystems of the provisioning server 120 and data providers 160 by sending and receiving corresponding signals, a messaging module 286 for sending messages (e.g., emails or text messages), and a graphical user interface (GUI) module 283 for user interaction therewith.

The provisioning server 120 may also communicate with a data transfer server 170, such as a transaction server, which generates data transfer instructions via an instruction generation module 172, sends and/or receives data transfer instructions between user devices 110 and data providers 160, and which processes data transfer instructions via an instruction processing module 174.

The provisioning server 120 also provides a data provider management module 122 which manages data providers and provides automated data provider provisioning. The data provider management module 122 comprises a web server module 140 for interfacing and communicating with user devices 110 and data providers 160 via the networks 112b and 112a, respectively. The data providers 160 are entities with which the user devices 110 can exchange data via data transfers. Data exchanges include sending and receiving data. Each data transfer is initiated by data transfer instructions. Examples of data providers are media providers, such as streaming or download services, digital newspapers, web services, etc.

The data provider management module 122 of the provisioning server 120 also comprises a message parser 142 that may include an optical character recognition (OCR) module 144, a template matching module 146, and optionally a machine learning (ML)/artificial intelligence (AI) module 148. The message parser 142 may include a document decoder/extractor which extracts data from encoded documents, such as an XML (eXtensible Markup Language) decoder/extractor for extracting XML data from a PDF (Portable Document Format) document or other document encoded with XML. The template matching module 146 compares data transfer instructions to data transfer instruction templates stored in a data transfer instruction template database 150, which may be part of the data provider database 138. The provisioning server 120 also includes a private messaging address database 152, which may be part of the account database 136. The private messaging address database 152 comprises one or more private messaging addresses for accounts in the account database 136, such as an email address or phone number. The private messaging addresses may be part of the database 136 and has account information and configuration data 156 of each account in the account database 136 rather than a separate database in some embodiments.

The provisioning server 120 provides automated data provider provisioning. In some embodiments, the provisioning server 120 receives a signal via the communication subsystem 328 from a first data transfer network 112a. The signal includes a message containing a data transfer instruction. The received signal including the message is a signal sent by a user from a user device 110. The message may be an email or text message. The provisioning server 120 identifies an account corresponding to a sender of the message in the account database 136. The sender may be identified by a sender identifier of the signal or message, such as a messaging address (e.g., email address or phone number) of the sender. A data provider addition procedure is automatically performed by the provisioning server 120 in response to determining that the message matches one or more message classification rules for a data provider addition request. The data provider addition procedure is described in more detail below in connection with FIGS. 4A and 4B. Data providers 160 may provide data transfer instruction templates to the provisioning server 120 for use by the template matching module 146 during template matching, as described in more detail below. The provided data transfer instruction templates are stored by the provisioning server 120 in the data transfer instruction template database 150.

The provisioning server 120 stores first provisioning data associated with users in the account database 136 in corresponding records, and stores second provisioning data associated with the data providers 160 in the data provider database 138. Data may be synchronized between the account database 136 and the data provider database 138 by linking information which links database records for a data provider in the account database 136 with records for a data provider in the data provider database 138. Thus, with reference to any entry or record stored in the account database 136, the corresponding entries or records located in the data provider database 138 may be located. The data provider management module 122 may perform various administration functions such as error management to analyze added data provider data and to correct any obvious errors.

The signals and other communications between the user devices 110, data providers 160 and provisioning server 120 may be secured or encrypted in an end-to-end fashion, or at any point of the communication exchange. For example, the user devices 110, data providers 160 and provisioning server 120 may communicate securely with each other and with other devices and systems using, for example, Transport Layer Security (TLS) or its predecessor Secure Sockets Layer (SSL). TLS and SSL are cryptographic protocols which provide communication security over the internet. TLS and SSL encrypt network connections above the transport layer using symmetric cryptography for privacy and a keyed message authentication code for message reliability. When users secure communication using TSL or SSL, cryptographic keys for such communication are typically stored in a persistent memory of the host device (e.g., user devices 110, data providers 160 or provisioning server 120). Other security measures may exist between the modules of the provisioning server 120.

The above-described communication system is provided for the purpose of illustration only. The above-described communication system includes one possible communication network configuration of a multitude of possible configurations. Suitable variations of the communication system will be understood to a person of skill in the art and are intended to fall within the scope of the present disclosure. The teachings of the present disclosure are flexible and capable of being operated in various different environments without compromising any major functionality. In some embodiments, the system includes multiple components distributed among a plurality of computing devices. One or more components may be in the form of machine-executable instructions embodied in a machine-readable medium.

User Device and Provisioning Server

Figure 2:
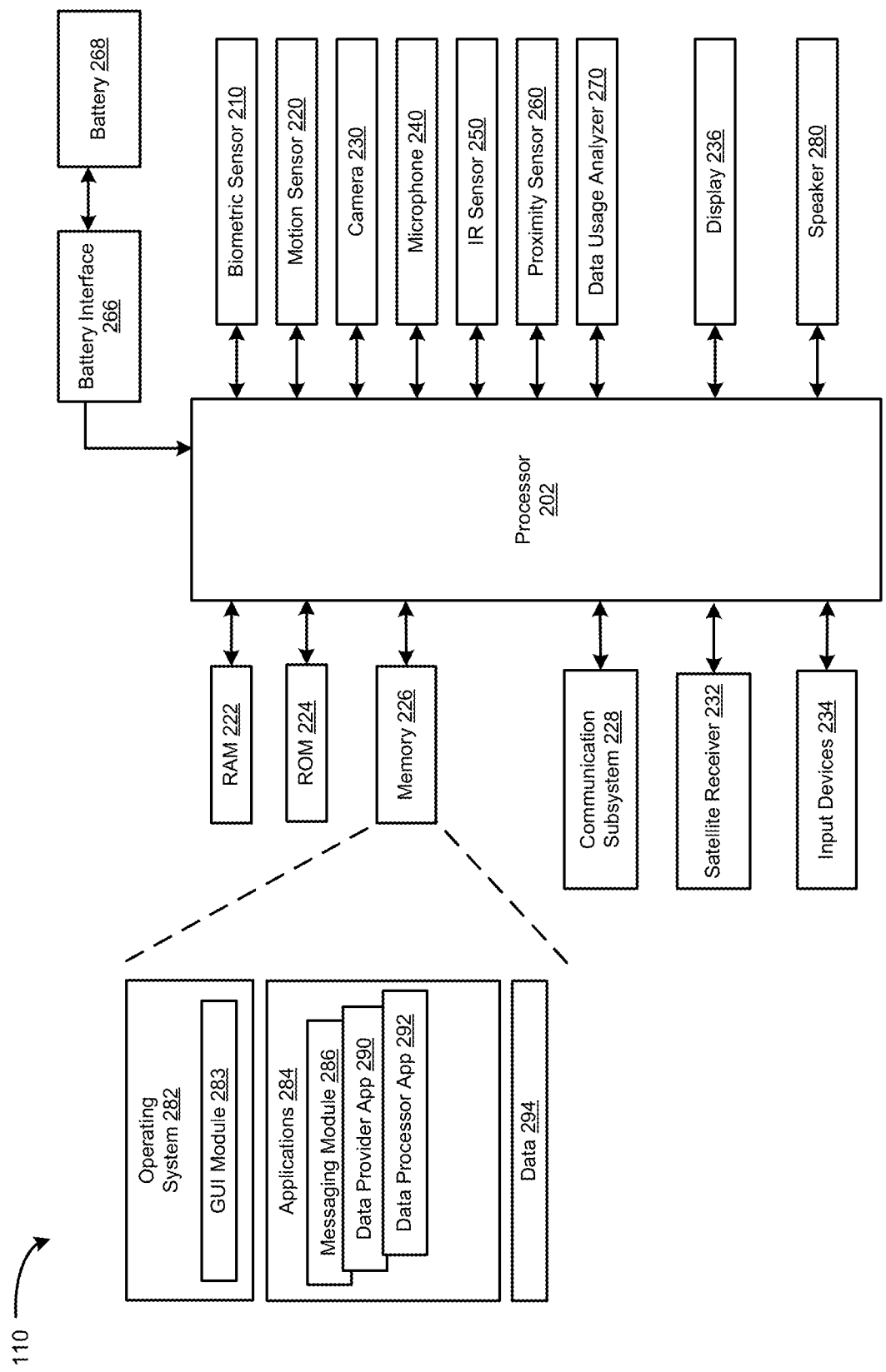
FIG. 2 is a block diagram of a provisioning server in accordance with one example embodiment of the present disclosure.

Reference is next made to FIG. 2 which illustrates in simplified block diagram form a user device 110 in accordance with one example embodiment of the present disclosure. The user device 110 comprises a controller comprising at least one processor 202 (such as a microprocessor) which controls the overall operation of the user device 110. The processor 202 is coupled to a plurality of components via a communication bus (not shown) which provides a communication path between the components and the processor 202. Examples of the user device 110 comprise, but are not limited to, handheld wireless communication devices, such as smartphones, tablets, laptop or notebook computers, netbook or ultrabook computers, vehicles having an embedded-wireless communication system, such as a Wi-Fi™ or cellular equipped in-dash infotainment system, or tethered to another wireless communication device having such capabilities. The mobile wireless communication devices may comprise devices equipped for cellular communication through PLMN or PSTN, mobile devices equipped for Wi-Fi™ communication over WLAN or WAN, or dual-mode devices capable of both cellular and Wi-Fi™ communication. In addition to cellular and Wi-Fi™ communication, the mobile wireless communication devices may also be equipped for Bluetooth™ and/or NFC communication. In various embodiments, the mobile wireless communication devices are configured to operate in compliance with any one or a combination of a number of wireless protocols, comprising GSM, GPRS, CDMA, EDGE, UMTS, EvDO, HSPA, 3GPP, or a variety of others. It will be appreciated that the mobile wireless communication devices may roam within and across PLMNs. In some instances, the mobile wireless communication devices are configured to facilitate roaming between PLMNs and WLANs or WANs, and are thus capable of seamlessly transferring sessions from a coupling with a cellular interface to a WLAN or WAN interface, and vice versa.

The processor 202 is coupled to RAM 222, ROM 224, persistent (non-volatile) memory 226 such as flash memory, a communication subsystem 228 for communication with one or more of the networks 112a-112c, a satellite receiver 232 for receiving satellite signals from a satellite network that comprises a plurality of satellites which are part of a global or regional satellite navigation system, and input devices 234, such as a touchscreen. The communication subsystem 228 may communicate via one or a combination of Bluetooth® or other short-range wireless communication protocol, Wi-Fi™, and a cellular, among other possibilities.

The user device 110 comprises a number of sensors coupled to the processor 202, comprising a biometric sensor 210, a motion sensor 220, a camera 230, a microphone 240, an IR sensor 250, a proximity sensor 260, and a data usage analyser 270.

The user device 110 comprises one or more input devices 234 and one or more output devices such as a display 236 and a speaker 280. The input devices 234 may comprise a keypad, keyboard or a touch-sensitive overlay with, together with the display 236, comprises a touchscreen. The user device 110 may also comprise one or more additional input devices such as buttons, switches, dials, or navigation tool, and/or one or more auxiliary output devices such as a vibrator or LED notification light, and possibly a data port such as serial data port (e.g., USB data port).

Operating system software 282 executed by the processor 202 is stored in the persistent memory 226 but may be stored in other types of memory devices, such as ROM 224 or similar storage element. The operating system 282 comprises a GUI module 283 for user interaction. A number of applications 284 executable by the processor 202 are also stored in the persistent memory 226 including a messaging module (application) 286 for email, text messaging and/or instant messaging, a data provider application 290 and a data processor application 292. The memory 226 also stores a variety of data 294. The data 294 may comprise messages including data transfer instructions, photos, a download cache comprising data downloaded via the communication subsystem 228, and saved files. System software, software modules, specific device applications, or parts thereof, may be temporarily loaded into a volatile store, such as RAM 222, which is used for storing runtime data variables and other types of data or information. Communication signals received by the user device 110 may also be stored in RAM 222. Although specific functions are described for various types of memory, this is merely one example, and a different assignment of functions to types of memory may be used in other embodiments.

The messaging module 286 may comprise an application programming interface (API), such as a communication add-on, that provides a daemon or background process, which monitors new messages that are received by the messaging module 286 to identify and detect messages from new data providers 160. The API may be configured to automatically forward the message to the provisioning server 120 and instruct the provisioning server 120 to automatically initiate the data provider addition procedure when a message from a new data provider 160 for which data transfers have not been provisioned is detected. To facilitate this function, the API is provided with a copy of the data provider list 154. The API may be configured to read new messages and associated data, such as attachments to emails and images embedded in MMS (Multimedia Messaging Service) messages, and/or the data transfer instructions contained therein to identify and detect messages as being from a new data provider 160.

The user device 110 may also comprise a battery 268 as a power source, such as one or more rechargeable batteries that may be charged, for example, through charging circuitry coupled to a battery interface such as the serial data port. The battery 268 provides electrical power to at least some of the components of the user device 110, and the battery interface 266 provides a mechanical and electrical connection for the battery 268.

Figure 3:
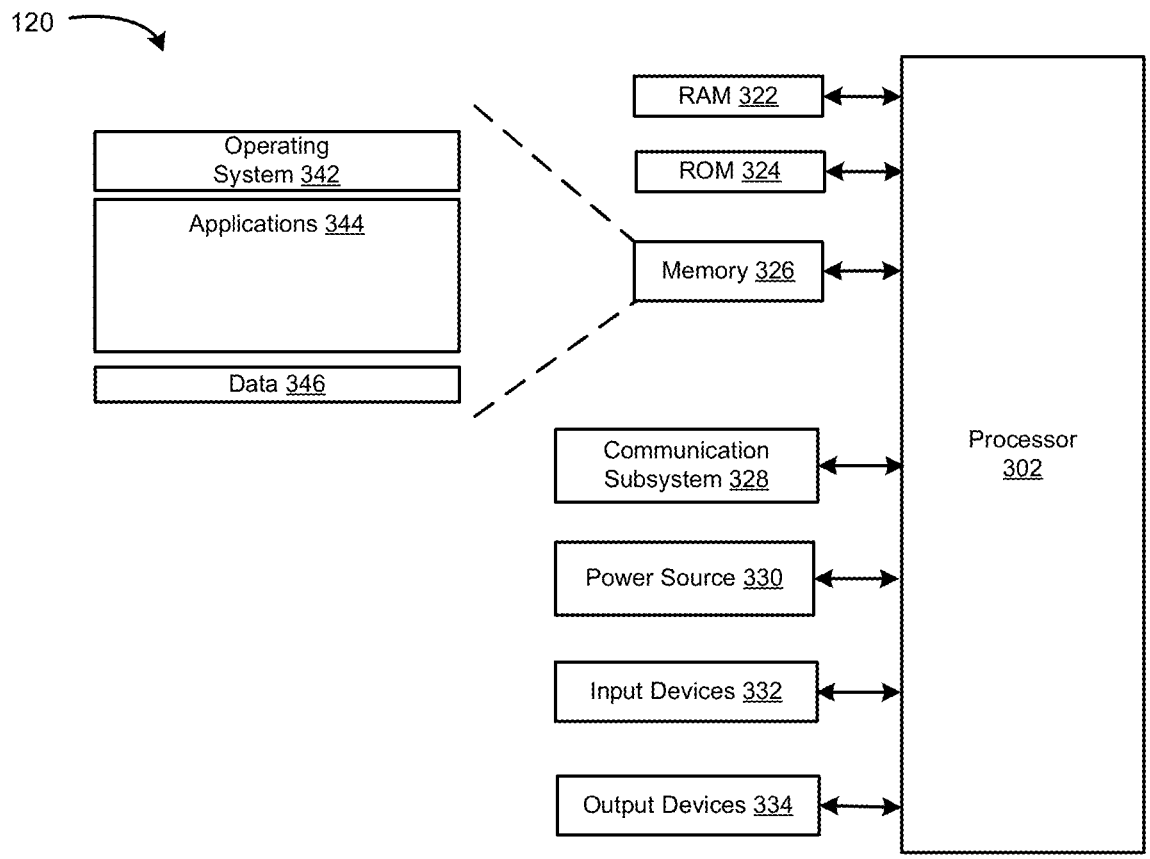
FIG. 3 is a block diagram of a user device in accordance with one example embodiment of the present disclosure.

Reference is next made to FIG. 3 which illustrates in simplified block diagram form one example embodiment of the provisioning server 120 in accordance with one example of the present disclosure. The processor 302 is coupled to RAM 322, ROM 324, persistent (non-volatile) memory 326 such as flash memory, the communication subsystem 328 for communication with one or more of the networks 112a-112c, and a power source 330.

The provisioning server 120 may comprise input devices 332 such as a keyboard and mouse or touchscreen and output devices 334 such as a display and a speaker. The provisioning server 120 may also comprise various data input/output (I/O) ports (not shown) such as serial data port (e.g., USB data port).

Operating system software 342 executed by the processor 302 is stored in the persistent memory 326 but may be stored in other types of memory devices, such as ROM 324 or similar storage element. A number of applications 344 executed by the processor 302 are also stored in the persistent memory 346. System software, software modules, specific device applications, or parts thereof, may be temporarily loaded into a volatile store, such as RAM 322, which is used for storing runtime data variables and other types of data or information. Communication signals received by the provisioning server 120 may also be stored in RAM 222. Although specific functions are described for various types of memory, this is merely one example, and a different assignment of functions to types of memory may be used in other embodiments.

Methods of Automated Data Provider Provisioning

Figure 4A:
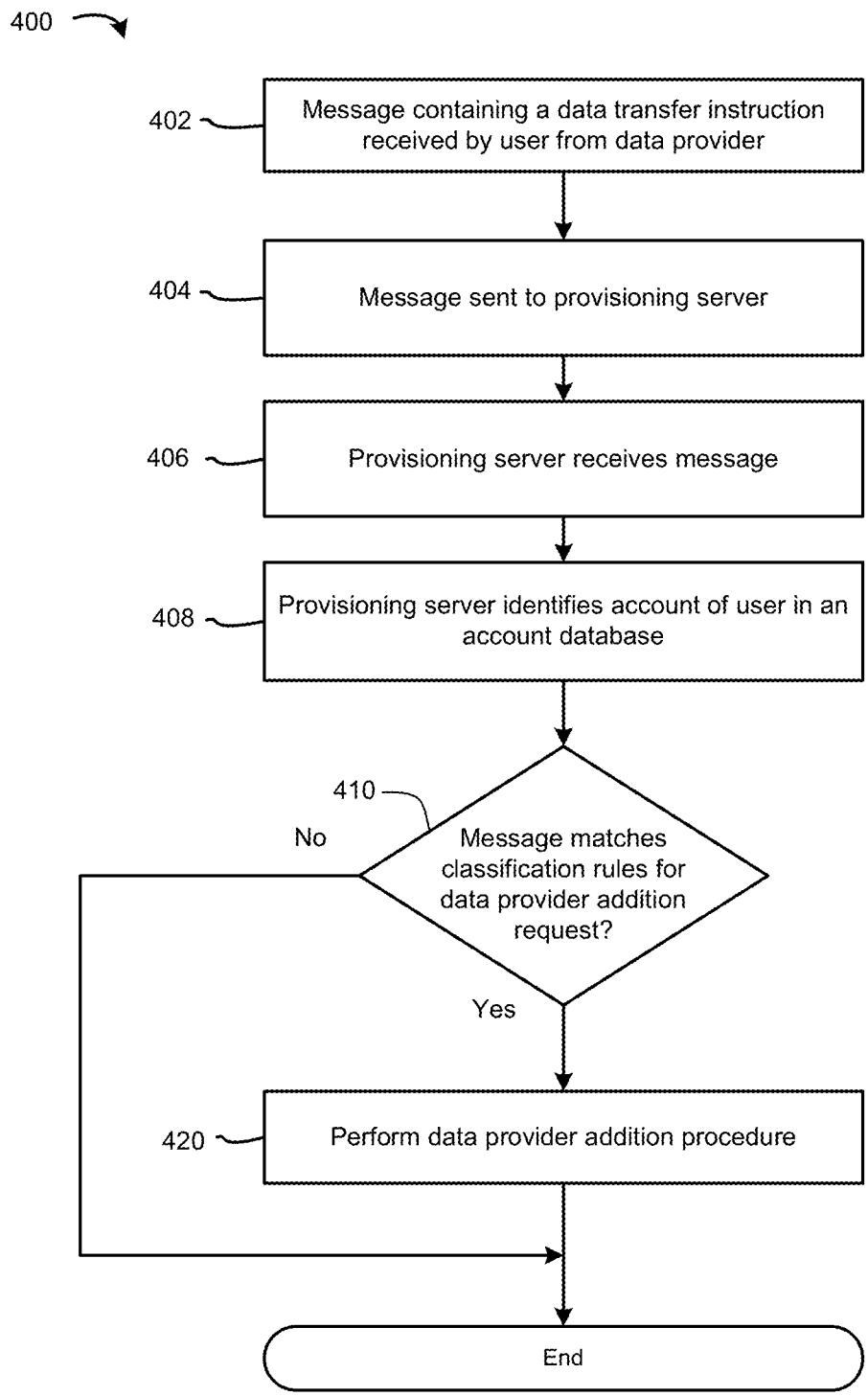
FIG. 4A is a flowchart illustrating a method for a provisioning server for automated data provider provisioning in accordance with an example embodiment of the present disclosure.

Referring next to FIG. 4A, a method 400 for the provisioning server 120 for automated data provider provisioning in accordance with one example embodiment of the present disclosure will be described. The method 400 allows a user to initiate the automated provisioning of data transfer communications with a data provider 160. The provisioned data transfer communications include at least sending data transfer communications to the data provider 160 and possibly receiving data transfer communications from the data provider 160. The method assumes that the user has an account with the provisioning server 120, the details of which are stored as an entry, record or profile within the account database 136 of the provisioning server 120. As noted above, each account may define one or more designated communication addresses (e.g., messaging addresses) for communications between the user and a data processor operating the provisioning server 120, for example, in the private messaging address database 152. The data processor may be a financial institution such as a bank. The one or more designated messaging addresses may comprise one or more email addresses or mobile telephone numbers. In at least some embodiments, the one or more designated messaging addresses are authenticated (or verified) using multi-factor authentication to increase security. Alternatively, the one or more designated messaging addresses may be assigned and allocated to the user by the data processor. For example, the one or more designated messaging addresses may be an email address in a domain of the data processor.

At operation 402, a user device 110 receives a signal including a message containing a data transfer instruction from an entity, such as a data provider 160, via the communication subsystem 228 of the user device 110. The message contains a data transfer instruction. The message may be an email message with the data transfer instruction contained in an attachment to the email message or contained in a body of the email message. Alternatively, the message may be a text message (e.g., MMS message) with the data transfer instruction contained as an image included in the text message (e.g., MMS message) or contained in a body of the text message (e.g., MMS message). The data transfer instruction may be a remittance request such as an invoice or bill, in which case the attachment or image comprises the remittance request (e.g., invoice or bill). When the data transfer instruction (e.g., remittance request) is provided as an image, the image may be provided by the data provider 160, or the image may be a photo captured by a digital camera 230 of the user device 110 or a screen capture of a display 236 of the user device 110.

The user may view the message containing the data transfer instruction on the user device 110 on the display 236 via the GUI using the messaging module 286, which provides an integrated messaging application or an appropriate messaging application such as email messaging application, text messaging application or instant messaging application. For example, when the message is an email message, the user may view the message within an email messaging application and, if the data transfer instruction is contained in an attachment to the email message, select and view the email attachment within the email messaging application or an associated viewer.

At operation 404, the user device 110 sends a signal including the message containing the data transfer instruction a designated messaging address defined in the private messaging address database 152 to the communication subsystem 328 of the provisioning server 120 to a designated address over a first data transfer network, such as the network 112b. The signal is sent from the user device 110 to the provisioning server 120 via the communication subsystem 228 using the messaging module 286. When the message is an email message, it may be sent to a designated email address within a domain of the provisioning server 120, such as newdp@dataprocessor.com. Alternatively, the message may be sent to a designated private email address of the user within a domain of the provisioning server 120, such as username@dataprocessor.com. When the message is a text message, it is sent to a designated mobile telephone number or designated short code (a 5 or 6 digit abbreviated phone number) associated with the provisioning server 120. The message sent from the user device 110 to the provisioning server 120 is typically a forwarded email or text message (e.g., MMS message) but may be a new email or text message (e.g., MMS message) composed by the user. Alternatively, the message may be sent to the provisioning server 120 by a dedicated data processor application 292 for communicating with the data processor on the user device 110, including communicating with the provisioning server 120.

The data processor application 292, while being executed and with the user logged in, may provide a user with an option, for example via GUI widget that may be invoked by an alert or prompt, to submit the data transfer instruction (e.g., invoice) through the data processor application 292, thereby avoiding the need to send a separate message.

At operation 406, the provisioning server 120 receives the signal from the user device 110 via the communication subsystem 328 from the first data transfer network. The data transfer network may be or comprise an email communication network or the internet, among other possibilities.

At operation 408, the provisioning server 120 identifies an account corresponding to the sender of the message in the account database 136 using identifying information of a sender or recipient of the signal. The identifying information may be a sender identifier of the signal, such as a messaging address from which the signal/message was sent, or a recipient identifier of the signal, such as the messaging address to which the signal/message was sent. The message is linked to the user account via an identifier, e.g. messaging address, linked to the user account in the private messaging address database 152.

At operation 410, the provisioning server 120 determines whether the message matches one or more message classification rules for a data provider addition request. The one or more message classification rules identify the message as a data provider addition request when one or more of the following conditions are met: the message is sent to a designated account or address (e.g., a designated email address within a domain of the provisioning server 120); the message is sent from a designated account or address (e.g., designated messaging address for the user stored in the private messaging address database 152); the message comprises a subject that includes one or more predetermined keywords (when the message is an email); the message comprises a body that includes one or more predetermined keywords; the message contains a data transfer instruction for a data provider for which a data provider record does not exist in the data provider list 154 of the user account in the account database 136; the message contains a data provider name or abbreviated data provider name for which a data provider record does not exist in the data provider list 154 of the user account in the account database 136; or the message contains one or more predetermined codes identifying the message as a data provider addition request and optionally a name or abbreviated name of a data provider and/or a location of the account identifier in the data transfer instruction.

The one or more message classification rules for a data provider addition request include conditions in that a data provider does exist in the data provider list 154 of the user account in the account database 136 and in that a data provider does not exist in the data provider list 154 of the user account in the account database 136. For example, the user may have multiple accounts with the same data provider and may seek to automatically provision a second or subsequent account of the user with the same data provider. The condition that a data provider does not exist in the data provider list 154 of the user account in the account database 136 is an example of one trigger condition for triggering the automatically provisioning operations of the present disclosure.

In response to a determination that the data provider does exist in the in the data provider list 154 of the user account in the account database 136 and that the data transfer instruction relates to an account with the data provider that has already been provisioned, a data transfer instruction may be automatically executed. Thus, the determination that the data provider does exist in the data provider list 154 of the user account in the account database 136 and that the data transfer instruction relates to an account with the data provider that has already been provisioned provides a trigger for generating and sending a data transfer instruction to the respective data provider based on the content of the data transfer instruction included in the message (e.g., when the data transfer instruction is an invoice, the data transfer may be financial transaction in the form of a payment to the data provider for an amount of the invoice). Thus, provides automatic generating and sending of a data transfer instruction by the provisioning server 120 or related server coupled to the provisioning server 120, such as a data transfer server (e.g., transaction server). When a related server is involved, the provisioning server 120 forwards the required information for the data transfer instruction to the related server which generates and sends the data transfer instruction.

To determine whether the message matches one or more message classification rules for a data provider addition request, the message parser 142 may be used depending on the one or more message classification rules applied. For example, to determine whether the message comprises a subject that includes one or more predetermined keyword or a body that includes one or more predetermined keywords, the message parser 142 is used to analyze the message subject and/or body. The message parser 142 may analyze the entire message thread. The message parser 142 may use natural language processing, structured language processing, or both, depending on the embodiment. The message body and subject (line) are parsed when the message is an email. The message parser 142 parses the message text into component parts based language rules based on the form, function, and syntactic relationship of each part of the message text. The parts, each part typically being a word, are then compared to the one or more predetermined keywords to determine whether a match exists. When the message is an email having an attachment or a text message with an embedded image, the OCR module 144 is used to identify and extract text from the attachment or image, the text being sent to the message parser 142 for further processing. Examples of the one or more predetermined keywords may be new data provider, new payee, new biller, new provider or the like.

To determine whether the message contains a data transfer instruction for a data provider for which a data provider record does not exist in the data provider list 154 of the user account in the account database 136, the message parser 142 is used to analyze the message and any attachment or image of the message, depending on the type of message, by parsing the text and comparing the parts to the names and/or abbreviated names of the data providers in the data provider database 138 to determine whether a match exists. If a match exists, the name and/or abbreviated name of the data provider is compared to the names and/or abbreviated names of the data providers in the data provider list 154 to determine whether a match exists.

To determine message contains a data provider name or abbreviated data provider name for which a data provider record does not exist in the data provider list 154 of the user account in the account database 136, the message parser 142 is used to analyze the message and any attachment or image of the message, depending on the type of message, by parsing the text and comparing the parts to the names and/or abbreviated names of the data providers in the data provider database 138 to determine whether a match exists. If a match exists, the name and/or abbreviated name of the data provider is compared to the names and/or abbreviated names of the data providers in the data provider list 154 to determine whether a match exists.

To determine whether the message contains one or more predetermined codes identifying the message as a data provider addition request, and optionally a name or abbreviated name of a data provider and/or a location of an account identifier in the data transfer instruction, the message parser 142 is used. The predetermined codes may be an alphanumeric string. The message parser 142 may use structured language processing in some embodiments to simply the determination. For example, the message parser 142 may analyze predetermined locations in the message body and/or subject to identify the one or more predetermined codes, name or abbreviated name of a data provider, and/or location of the data provider name in the data transfer instruction. The predetermined locations may be absolute and/or relative, depending on the embodiment. For example, the set of data comprising the predetermined codes, name or abbreviated name of a data provider, and/or location of the data provider name in the data transfer instruction may have an absolute predetermined location in that the set of data is located in the message body or subject. However, each of the predetermined codes, name or abbreviated name of a data provider, and/or location of the data provider name in the data transfer instruction may have a relative location to each other within the absolute location, i.e. first predetermined codes, then the name or abbreviated name of a data provider, followed by the location of the data provider name in the data transfer instruction. As an example, the message subject may contain the code P3 identifying the message as a data provider addition request, followed by the name "Violet" identifying the new data provider, followed by the location "line 5" identifying the location of the account identifier in the data transfer instruction. The one or more predetermined codes are provided by the user and identify the message as a data provider addition request, and optionally a name or abbreviated name of a data provider and/or a location of an account identifier in the data transfer instruction are provided to assist the provisioning server 120 by identifier where in the data transfer instruction to look for the name or abbreviated name of the data provider payee or provide the name or abbreviated name of the data provider.

Alternatively, the message may be encoded by the user device 110 to be automatically recognized by the provisioning server 120 as a data provider addition request. The message may be encoded to be automatically recognized by the provisioning server 120 as a data provider addition request by the messaging application on the user device 110 or possibly a dedicated data processor application 292 for communicating with the data processor on the user device 110. The data transfer instruction from the data provider 160 received by the user device 110 in operation 402 may also be received by a client application other than the messaging module/application 286, such as a data provider application 290.

At operation 420, the provisioning server 120 automatically performs the data provider addition procedure when the message is determined to match one or more message classification rules for a data provider addition request. When the message is determined not to match one or more message classification rules for a data provider addition request, the message from the user is ignored and not processed further. A signal including a message including a notification of the failure may be sent by the provisioning server 120 to the designated messaging address from which the signal was received. The message may also include a hyperlink or instructions for a user to provide requested provisioning data to proceed with manual provisioning of the data provider for data transfer communications.

Data Provider Addition Procedure

Figure 4B:
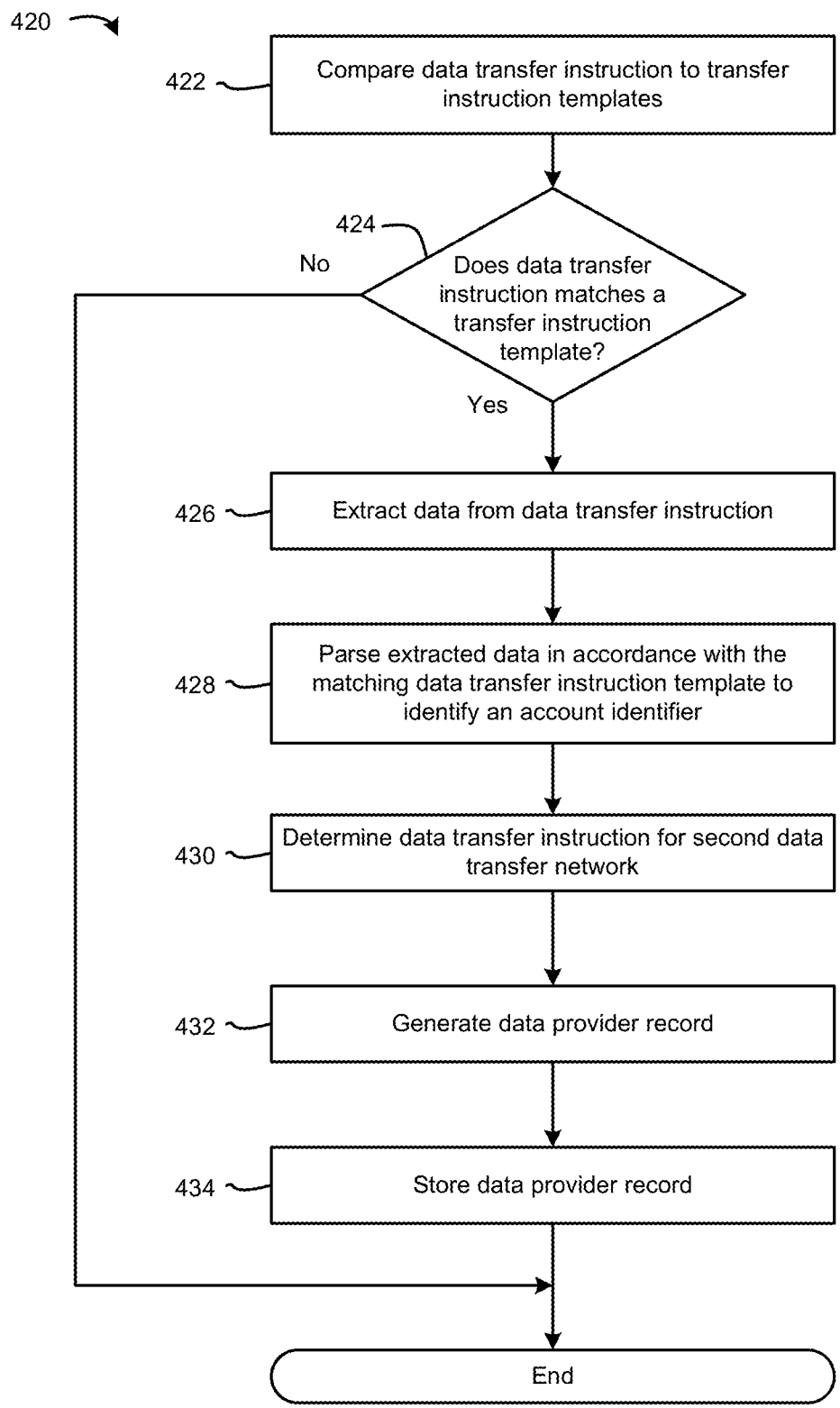
FIG. 4B is a flowchart illustrating a data provider addition procedure of the method for a provisioning server for automated data provider provisioning of FIG. 4A in accordance with an example embodiment of the present disclosure.
Figure 5A:
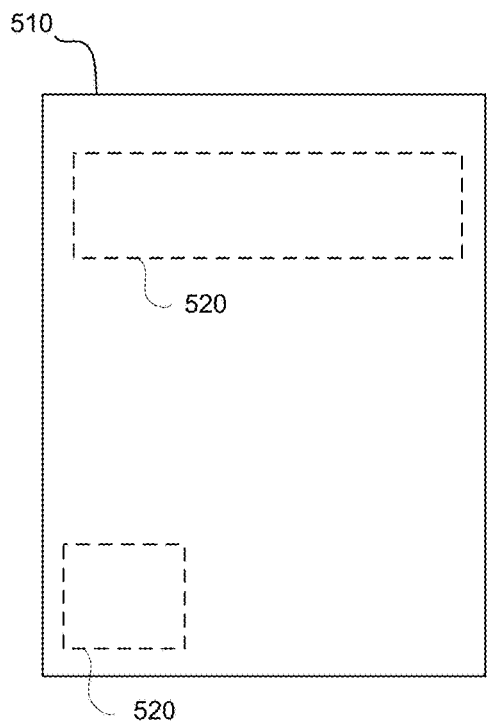
FIGS. 5A-5D are example data transfer instruction template layouts.
Figure 5B:
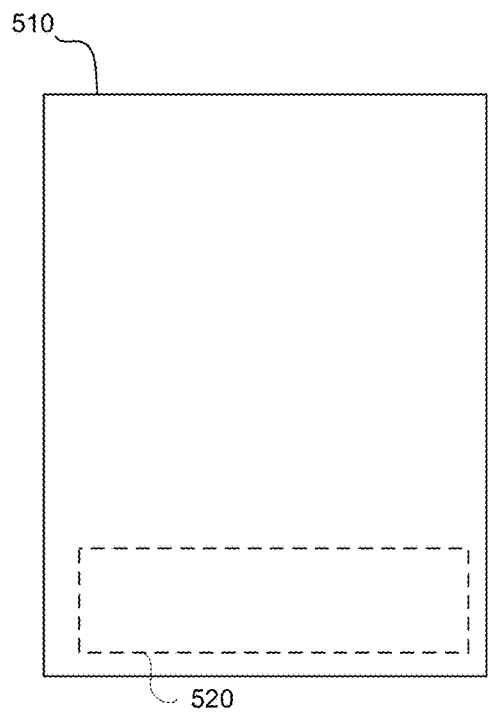
Figure 5C:
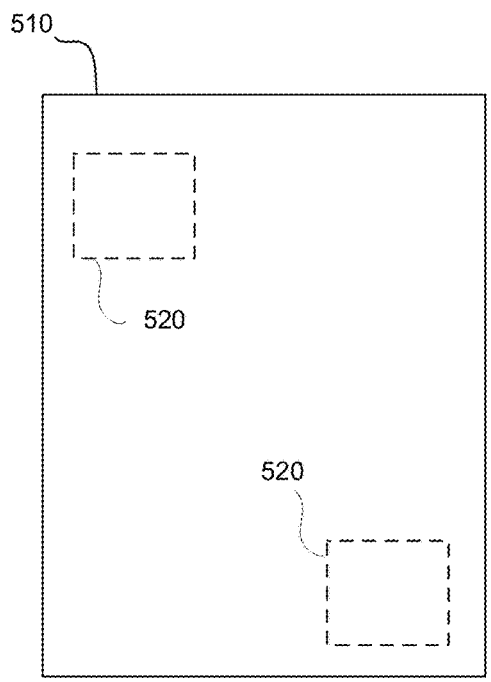
Figure 5D:
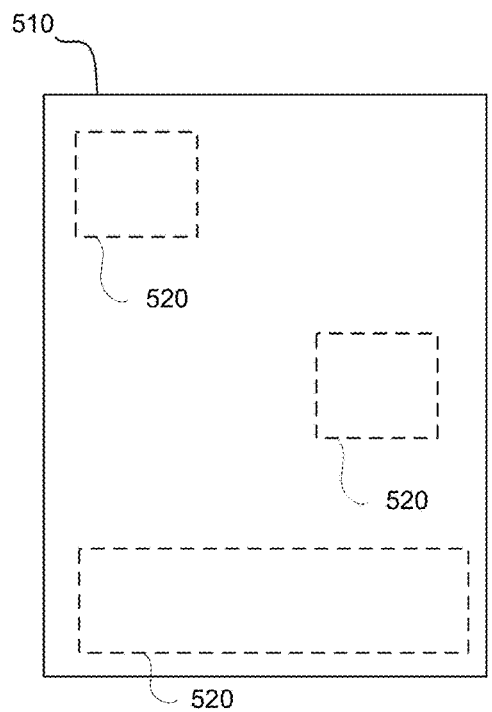

The data provider addition procedure 420 will now be described with reference to FIG. 4B. At operation 422, the provisioning server 120 compares the data transfer instruction to a plurality of data transfer instruction templates in a data transfer instruction template database 150.

Next, at operation 424 based on the comparison it is determined by the provisioning server 120 whether any data transfer instruction template matches the data transfer instruction, and if so the matching data transfer instruction template is identified.

When comparing the data transfer instruction to the plurality of data transfer instruction templates in the data transfer instruction template database 150 to identify any matching data transfer instruction template, the provisioning server 120 in at least some embodiments compares one or more of the following: at least a portion of layout or format of the data transfer instruction to at least a portion of a layout or format of the plurality of data transfer instruction templates; or at least a portion of a content of the data transfer instruction to at least a portion of a content of the plurality of data transfer instruction templates.

FIGS. 5A-5D are example data transfer instruction template layouts 510. The data transfer instruction template and data transfer instruction template layouts 510 may be provided to the data processor operating the provisioning server 120 by the data provider 160 for use by the provisioning server 120 to facilitate the data provider addition procedure 420. When the data provider 160 updates the data transfer instruction, the new data transfer instruction template and new data transfer instruction template layouts 510 are provided to the provisioning server 120 which updates the data transfer instruction template stored in the data transfer instruction template database 150, including any data transfer instruction template layouts 510. Each of the data transfer instruction template layouts 510 contain one or more predetermined areas of interest 520, which vary between data transfer instruction template layouts 510. The predetermined areas of interest 520 may be specified by the respective data provider 160 in advance.

The provisioning server 120 compares the data transfer instruction contained in the received message with the data transfer instruction template 510. In some embodiments only the predetermined areas of interest 520 are compared, the predetermined areas of interest 520 being the compared portions. When comparing the layout or format of the data transfer instructions to the data transfer instruction templates, the provisioning server 120 determines whether the predetermined areas of interest 520 are in the same locations. When compared the content of the data transfer instructions to the data transfer instruction templates, the provisioning server 120 determines whether the type of content in the predetermined areas of interest 520 is the same. The type of content determination uses the message parser 142 to determine whether the same type of information is present, for example, does the predetermined area of interest 520 include an account identifier, account holder name, data provider name etc. This may comprise determining whether the same number of elements is present, whether the elements are present in the same order, and/or whether the elements are of the same size or within an allowable range.

When one or both of the layout or format of the data transfer instructions or the content of the data transfer instructions in the predetermined areas of interest 520 matches a data transfer instruction template, a match is determined, and the data provider 160 associated with that matching template is identified as the data provider 160 for the data provider addition procedure 420 if this was not specified in the message or previously determined when evaluating the one or more message classification rules for the data provider addition request. The provisioning server 120 may determine the data provider name based on metadata associated with the matching data transfer instruction template stored in the data transfer instruction template database 138.

When the data transfer instruction matches a data transfer instruction template in the data transfer instruction template database 150, the operations proceed to operation 426 at which data from the data transfer instruction for the data provider addition based on the matching data transfer instruction template is extracted. The extraction may comprise OCR or encoding extraction (e.g., XML extraction) when an attachment or image is associated with the message. For example, if the document is not encoded, OCR may be performed to obtain text that is sent to the message parser 142 for further processing. If the document is encoded, a decoder/encoding extractor (e.g., XML extractor) may be used to obtain text that is sent to the message parser 142 for further processing. It will be appreciated that the message parser 142 may be used at different times throughout the method 400. The results of the message parser 142 may be maintained (persisted) throughout the method 400 as run-time data to enhance efficiency, the results being re-used if appropriate if the message parser 142 is called again at a later operation in the method 400.

When the data transfer instruction does not match a data transfer instruction template in the data transfer instruction template database, the message from the user is ignored and not processed further. A signal including a message including a notification of the failure may be sent by the provisioning server 120 to the user. The message may also include a hyperlink or instructions to provide requested provisioning data.

At operation 428, the provisioning server 120 parses the extracted data in accordance with the matching data transfer instruction template to identify an account identifier.

The ML/AI module 148 may be used to assist in determining the data provider 160 and account identifier. A feedback loop may confirm that the data provider provisioning was correct or incorrect for the user account.

At operation 430, the provisioning server 120 determines data transfer information for a second data transfer network, such as the network 112a, for the identified data provider and the identified account identifier from the data provider database 138. The data transfer information, also known as provisioning data, may comprise remittance data for the data providers 160. The remittance data may be provided by the data providers 160 or operated by an operator of the provisioning server 120 from the data providers 160. The remittances may be bill payments or bill payment instructions, in which case the data transfer information may comprise biller remittance data for the data providers 160. The second data transfer network may be or comprise a bank transaction network, a shared payment transaction network or the internet, among other possibilities.

At operation 432, the provisioning server 120 generates a data provider record including the identified data provider name and identified account identifier and the data transfer information for the second data transfer network for the identified data provider and identified account identifier.

At operation 434, the provisioning server 120 stores the data provider record in the data provider list 154 of the account in the account database 136.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

General

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device (e.g., a data manager) to execute examples of the methods disclosed herein.

The term "processor" may comprise any programmable system comprising systems using micro- or nano-processors/controllers, reduced instruction set circuits (RISC), application specific integrated circuits (ASICs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A provisioning server for automated data provider provisioning, comprising:
   a processor;
   a communication subsystem coupled to the processor;
   a memory coupled to the processor; and
   wherein the processor is configured to:
      receive a message containing a data transfer instruction, the data transfer instruction being from a first account associated with a first entity to a second account associated with a second entity;
      identify the first account from a user account database using a messaging address of a sender of the message, wherein the user account database comprises mappings between user account identifiers and messaging addresses and first provisioning data for provisioning data transfers with user accounts;
      automatically perform a data provider addition procedure in response to a determination that the message matches one or more message classification rules for a data provider addition request, the data provider addition procedure comprising:
         extracting data from the data transfer instruction for the data provider addition based on a matching data transfer instruction template;
         parsing the extracted data in accordance with the matching data transfer instruction template to identify an account identifier of the second account associated with the second entity;
         determining, from a data provider database distinct from the user account database, second provisioning data for provisioning data transfers to the second account associated with the second entity using the account identifier of the second account, the data provider database comprising provisioning data for provisioning data transfers with a plurality of data providers registered with the provisioning server, the data provider database comprising data provider information comprising data provider names for the plurality of data providers registered with the provisioning server;
         generating a data provider record including the data provider name, account identifier and the second provisioning data of the second account associated with the second entity; and
         storing the data provider record in a data provider list of the first account in the user account database.

2. The provisioning server of claim 1, wherein the processor is further configured to determine whether the message matches one or more message classification rules for the data provider addition request, wherein the one or more message classification rules identify the message as a data provider addition request in response to a determination that one or more of the following conditions are met:
   the message is sent to a designated account or address;
   the message is sent from a designated account or address;
   the message comprises a subject that includes one or more predetermined keywords;
   the message comprises a body that includes one or more predetermined keywords or codes;
   the message contains a data transfer instruction for a data provider for which a data provider record does not exist in the data provider list of the account in the user account database;
   the message contains a name or abbreviated name of a data provider for which a data provider record does not exist in the data provider list of the account in the user account database; or
   the message contains one or more predetermined codes identifying the message as a data provider addition request, a name or abbreviated name of a data provider and a location of the account identifier in the data transfer instruction.

3. The provisioning server of claim 1, wherein the processor is further configured to:
   during the data provider addition procedure: compare the extracted data to a plurality of data provider names to identify any matching data provider name in response to a determination that the data provider was not specified in the message or previously determined during evaluating the one or more message classification rules for the data provider addition request.

4. The provisioning server of claim 1, wherein the data provider name is determined based on the matching data transfer instruction template.

5. The provisioning server of claim 1, wherein the message includes an email message.

6. The provisioning server of claim 5, wherein the data transfer instruction is contained in an attachment to the email message.

7. The provisioning server of claim 5, wherein the data transfer instruction is contained in a body of the email message.

8. The provisioning server of claim 1, wherein the message is encoded to be automatically recognized as a data provider addition request.

9. The provisioning server of claim 1, wherein the data transfer instruction is provided as an image, the image being a photo captured by a digital camera of a user device or a screen capture of a display of the user device.

10. The provisioning server of claim 1, wherein the data transfer instruction includes an invoice.

11. The provisioning server of claim 1, wherein the processor is further configured to:
   compare the data transfer instruction to a plurality of data transfer instruction templates in a data transfer instruction template database to identify any matching data transfer instruction template by comparing one or more of the following:

at least a portion of layout or format of the data transfer instruction to at least a portion of a layout or format of the plurality of data transfer instruction templates; or at least a portion of a content of the data transfer instruction to at least a portion of a content of the plurality of data transfer instruction templates.

12. The provisioning server of claim 1, wherein the message is associated with a first data transfer network and the data transfer instruction is associated with a second data transfer network.

13. The provisioning server of claim 12, wherein the first data transfer network comprises an email communication network and the second data transfer network comprises a bank transaction network.

14. A method for a provisioning server for automated data provider provisioning, comprising:

receiving a message containing a data transfer instruction, the data transfer instruction being from a first account associated with a first entity to a second account associated with a second entity;

identifying the first account from a user account database using a messaging address of a sender of the message, wherein the user account database comprises mappings between user account identifiers and messaging addresses and first provisioning data for provisioning data transfers with user accounts;

automatically performing a data provider addition procedure in response to a determination that the message matches one or more message classification rules for a data provider addition request, the data provider addition procedure comprising:

extracting data from the data transfer instruction for the data provider addition based on a matching data transfer instruction template;

parsing the extracted data in accordance with the matching data transfer instruction template to identify an account identifier of the second account associated with the second entity;

determining, from a data provider database distinct from the user account database, second provisioning data for provisioning data transfers to the second account associated with the second entity using the account identifier of the second account, the data provider database comprising provisioning data for provisioning data transfers with a plurality of data providers registered with the provisioning server, the data provider database comprising data provider information comprising data provider names for the plurality of data providers registered with the provisioning server;

generating a data provider record including the data provider name, account identifier and the second provisioning data of the second account associated with the second entity; and storing the data provider record in a data provider list of the first account in the user account database.

15. The method of claim 14, further comprising:

determining whether the message matches one or more message classification rules for the data provider addition request, wherein the one or more message classification rules identify the message as a data provider addition request in response to a determination that one or more of the following conditions are met:

the message is sent to a designated account or address;
the message is sent from a designated account or address;

the message comprises a subject that includes one or more predetermined keywords or codes;

the message comprises a body that includes one or more predetermined keywords;

the message contains a data transfer instruction for a data provider for which a data provider record does not exist in a data provider list of the account in the user account database;

the message contains a name or abbreviated name of a data provider for which a data provider record does not exist in the data provider list of the account in the user account database; or the messages contains one or more predetermined codes identifying the message as a data provider addition request, a name or abbreviated name of a data provider and a location of the account identifier in the data transfer instruction.

16. The method of claim 14, further comprising:

during the data provider addition procedure:

comparing the extracted data to a plurality of data provider names to identify any matching data provider name in response to a determination that the data provider was not specified in the message or previously determined during evaluating the one or more message classification rules for the data provider addition request.

17. The method of claim 14, further comprising:

comparing the data transfer instruction to a plurality of data transfer instruction templates in a data transfer instruction template database to identify any matching data transfer instruction template by comparing one or more of the following:

at least a portion of layout or format of the data transfer instruction to at least a portion of a layout or format of the plurality of data transfer instruction templates; or at least a portion of a content of the data transfer instruction to at least a portion of a content of the plurality of data transfer instruction templates.

18. The method of claim 14, wherein the message is associated with a first data transfer network and the data transfer instruction is associated with a second data transfer network.

19. The method of claim 14, wherein the first data transfer network comprises an email communication network and the second data transfer network comprises a bank transaction network.

20. A non-transitory machine-readable medium having tangibly stored thereon executable instructions for execution by a processor of a provisioning server, wherein the executable instructions, in response to execution by the processor, cause the provisioning server to:

receive a message containing a data transfer instruction, the data transfer instruction being from a first account associated with a first entity to a second account associated with a second entity;

identify the first account from a user account database using a messaging address of a sender of the message, wherein the user account database comprises mappings between user account identifiers and messaging addresses and first provisioning data for provisioning data transfers with user accounts;

automatically perform a data provider addition procedure in response to a determination that the message matches one or more message classification rules for a data provider addition request, the data provider addition procedure comprising:

extracting data from the data transfer instruction for the data provider addition based on a matching data transfer instruction template;

parsing the extracted data in accordance with the matching data transfer instruction template to identify an account identifier of the second account associated with the second entity;

determining, from a data provider database distinct from the user account database, second provisioning data for provisioning data transfers to the second account associated with the second entity using the account identifier of the second account, the data provider database comprising provisioning data for provisioning data transfers with a plurality of data providers registered with the provisioning server, the data provider database comprising data provider information comprising data provider names for the plurality of data providers registered with the provisioning server;

generating a data provider record including the data provider name, account identifier and the second provisioning data of the second account associated with the second entity; and storing the data provider record in a data provider list of the first account in the user account database.

* * * * *